May 23, 1939.   S. J. MAX   2,159,903
AUTOMOBILE SLIDE AERIAL
Filed Oct. 4, 1937
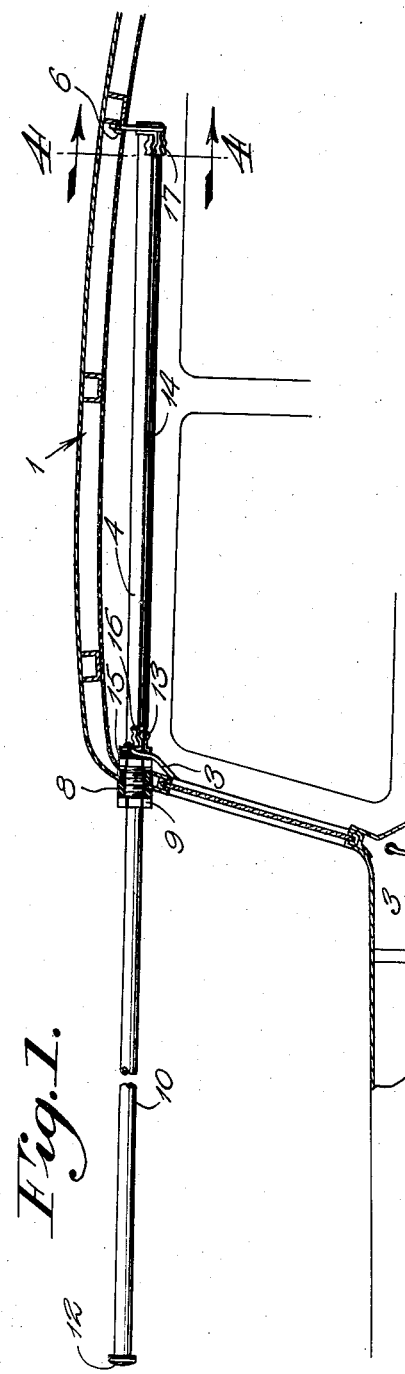
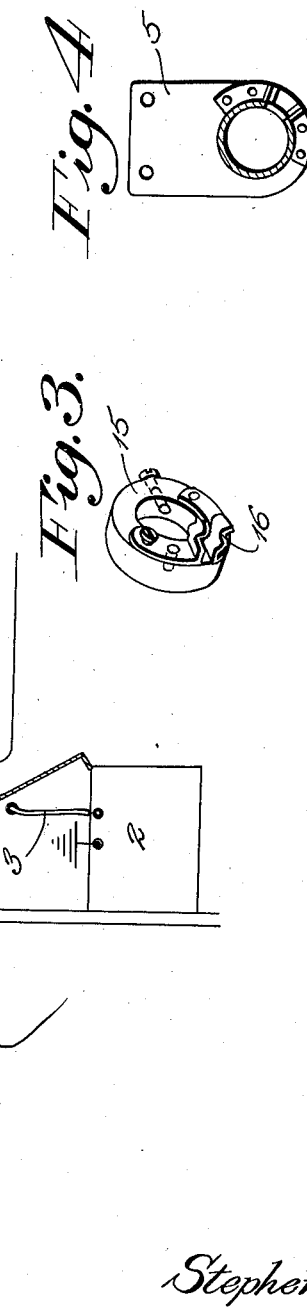
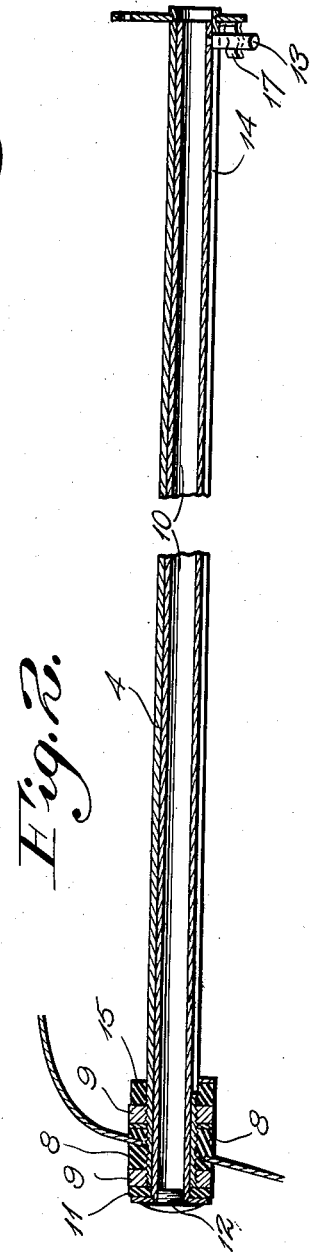
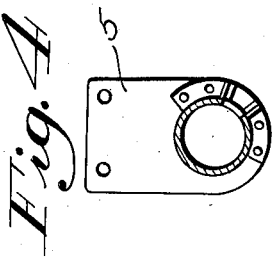
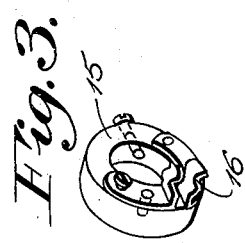
Stephen J. Max
INVENTOR
BY Victor J. Evans & Co.
ATTORNEYS
WITNESS R. E. Wise Patented May 23, 1939

2,159,903

UNITED STATES PATENT OFFICE 2,159,903

AUTOMOBILE SLIDE AERIAL

Stephen J. Max, Buffalo, N. Y.

Application October 4, 1937, Serial No. 167,271

1 Claim. (Cl. 250—33)

This invention relates to radio aerials adapted for motor vehicles and radio receiving sets employed in the latter and has for the primary object the provision of an aerial element and a mounting therefor, which will permit said aerial element to be easily extended outwardly of the body of a vehicle when desiring radio reception and which may be moved to lie substantially wholly within the body of the vehicle when not in use so as not to detract from the appearance of the vehicle and will disconnect itself from the radio receiving set and ground on the vehicle when moved to its fullest innermost position of the latter to safeguard against attracting lightning.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a motor vehicle body equipped with a radio aerial constructed in accordance with my invention.

Figure 2 is a fragmentary vertical sectional view showing the aerial element moved substantially wholly within the body of the vehicle.

Figure 3 is a perspective view illustrating a contact element.

Figure 4 is a sectional view taken on the line 4—4 of Figure 1.

Referring in detail to the drawing, the numeral 1 indicates a fragmentary portion of a motor vehicle body, 2 an aerial receiving set mounted therein and 3 the lead-in conductor thereof.

To attach the present invention on the motor vehicle body, the latter is provided with an opening preferably in the roof construction of the body directly above the windshield and receives therein one end of a supporting sleeve 4 constructed of insulating material. The supporting sleeve substantially parallels the roof of the body within the latter and a bracket 5 is mounted on the sleeve and may be attached on the roof of the vehicle, as shown at 6. The end of the sleeve located in the opening of the body has mounted thereon washers 8 engageable with the inner and outer faces of the body. Nuts 9 are threaded on the sleeve and against the washers 8 to effect a seal between the sleeve and the motor vehicle body.

An aerial element 10 preferably in the form of a tube is slidably supported by the sleeve and one end thereof is equipped with a washer 11 to abut one of the nuts 9 when the aerial element is fully within the sleeve to exclude weather elements from the sleeve. A cap type set bolt 12 threads into the end of the aerial element 10 and against the washer 11. It is preferable that the washers 8 and 11 be constructed of rubber or any other material capable of providing an effective seal and which will be yieldable. The aerial element 10 is constructed of conductive material and may be of hollow formation and has secured thereto a handle 13 operating in a slot 14 formed in the supporting sleeve. Through the use of the handle 13 a person may readily slide the aerial element inwardly and outwardly of the sleeve and when outwardly thereof will be positioned exteriorly of the body of the motor vehicle.

A ring-like member 15 is mounted on the supporting sleeve 4 adjacent to one of the nuts 9 and carries resilient contact elements 16, the latter being connected to the lead-in conductor 3 of the radio receiving set. The contacts 16 are in alignment with the slot 14 of the sleeve so that when the sleeve is moved forwardly the handle moves into engagement with the contacts 16 thereby establishing an electrical connection between the aerial element and the lead-in conductor 3 of the radio receiving set. The handle 13 is made of electrical conductive material. The bracket 5 is constructed of electrical conductive material and has secured thereon contacts 17 to be engaged by the handle 13 when the aerial is moved fully within the supporting sleeve so as to ground the aerial element onto the body of the vehicle. The aerial element when positioned fully within the supporting sleeve has its connection interrupted with the radio receiving set due to the handle moving out of engagement with the contacts 16. It is to be understood that when the radio receiving set is not in use the aerial element 10 is moved inwardly of the supporting sleeve so as not to mar the outward appearance of the vehicle. However, when positioned outwardly of the sleeve it is disposed a proper distance from the vehicle construction so as not to be affected thereby and permit efficient radio reception to be had by the receiving set 2.

What is claimed is:

An aerial for motor vehicles comprising a sleeve having one end mounted in an opening in a wall of a motor vehicle body, an electrical conductive bracket supporting said sleeve on the body of the vehicle, a combined sealing and securing means between the body and the sleeve, an aerial element slidably supported by said sleeve and capable of being moved outwardly thereof to extend exteriorly of the body of the vehicle, said sleeve having a slot, a handle of electrical conductive material secured on said aerial element and extending through the slot, contact elements carried by the bracket to be engaged by the handle for grounding the aerial element on the body when moved inwardly of said sleeve, contact elements carried by said sleeve and connected to a radio receiving set to be engaged by the handle when the aerial element is moved outwardly of said sleeve and body of the vehicle.

STEPHEN J. MAX.